United States Patent
Czimmek et al.

(10) Patent No.: US 9,157,545 B2
(45) Date of Patent: Oct. 13, 2015

(54) AUTOMOTIVE AIR BYPASS VALVE

(75) Inventors: Perry Robert Czimmek, Williamsburg, VA (US); Michael J. Hornby, Williamsburg, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 1077 days.

(21) Appl. No.: 12/812,612

(22) PCT Filed: Feb. 17, 2009

(86) PCT No.: PCT/US2009/034228
§ 371 (c)(1),
(2), (4) Date: Jul. 13, 2010

(87) PCT Pub. No.: WO2009/108532
PCT Pub. Date: Sep. 3, 2009

(65) Prior Publication Data
US 2010/0294966 A1   Nov. 25, 2010

Related U.S. Application Data

(60) Provisional application No. 61/066,350, filed on Feb. 19, 2008.

(51) Int. Cl.
F02B 37/16 (2006.01)
F02B 39/00 (2006.01)
F16K 31/06 (2006.01)

(52) U.S. Cl.
CPC ............ *F16K 31/0655* (2013.01); *F02B 37/16* (2013.01); *F02B 39/00* (2013.01); *Y02T 10/144* (2013.01)

(58) Field of Classification Search
CPC ................................ F02B 37/16; F02B 39/00
USPC ............... 251/129.07, 129.15, 129.17, 129.2; 137/316, 315.03, 625.25; 123/568.26; 335/253, 270, 262, 271, 272
See application file for complete search history.

(56) References Cited

U.S. PATENT DOCUMENTS

| 2,596,409 A | 5/1952 | Johnson et al. |
| 5,146,196 A * | 9/1992 | Frank ............................ 335/271 |

(Continued)

FOREIGN PATENT DOCUMENTS

| CH | 694279 A5 | 10/2004 |
| DE | 19740580 A1 | 3/1999 |

(Continued)

OTHER PUBLICATIONS

PCT International Preliminary Report on Patentability in PCT/US2009/034228.

(Continued)

*Primary Examiner* — John K Fristoe, Jr.
*Assistant Examiner* — Daphne M Barry

(57) ABSTRACT

An air bypass valve (10) includes a solenoid assembly (30) including a magnetic housing (32), a coil bobbin (34) in the magnetic housing, a coil (36) disposed about the coil bobbin, and a magnetic flux ring (38) coupled with the magnetic housing. An armature and seal assembly (12) includes an armature structure (14, 16) that can move with respect to the solenoid assembly from a closed position to an open position in response to a magnetic field generated by the coil. Seal structure (22) is coupled with armature structure so that the seal structure can pivot with respect to the armature structure. The seal structure has a sealing edge (28) to seal with a manifold component when the armature structure is in the closed position thereof. A spring (44) biases the armature structure to the closed position and a main housing covers (46) the magnetic housing.

20 Claims, 4 Drawing Sheets

(56) References Cited

U.S. PATENT DOCUMENTS 5,685,519 A * 11/1997 Bircann et al. .......... 251/129.15
6,903,647 B2 * 6/2005 Linkner et al. ................ 336/208

FOREIGN PATENT DOCUMENTS

| DE | 10020041 | A1 | 10/2001 |
| EP | 1762712 | A | 3/2007 |
| WO | 2007048828 | A | 5/2007 |
| WO | 2009105405 | A1 | 8/2009 |
| WO | 2009108531 | A1 | 9/2009 |
| WO | 2009108533 | A1 | 11/2009 |

OTHER PUBLICATIONS

Written Opinion in PCT International Application No. PCT/US2009/034228, Aug. 24, 2010.
Search Report in PCT International Application No. PCT/US2009/034228, Oct. 7, 2009.

* cited by examiner

AUTOMOTIVE AIR BYPASS VALVE

This application is based on U.S. Provisional Application No. 61/066,350 filed on Feb. 19, 2008, claims the benefit thereof for priority purposes, and is hereby incorporated by reference into this specification.

FIELD

The embodiment relates to a solenoid device for the bypass of intake air in an automotive application and, more particularly, to an improved air intake valve for a vehicle.

BACKGROUND

Automotive applications typically using an air pump, specifically a turbine, supercharger, or exhaust driven turbocharger, include gasoline, natural gas or diesel internal combustion engines. Other automotive applications also include fuel cells and fuel reformers, both requiring large volumes of air and often supplied by a turbine pump. While a bypass valve may be utilized for any pump configuration, the exhaust driven turbocharger is the typical application. The exhaust driven turbocharger is a free-spinning turbine with a shaft-separated split impeller, one end receiving force and a rotational moment from the exiting exhaust gases, the other end applying a pumping effect. As it is a free-spinning turbine, if the load on the air side suddenly increases due to a sudden decrease of demand by the engine, such as during deceleration, the pump will see a dramatic decrease in rotation and the corresponding sudden decrease in cooling effect, lubricating effect, as well as a high fatigue load on the impeller blades.

For the purpose of reducing the load on the turbocharger during sudden decreases of downstream flow, a bypass valve is typically applied to allow the impeller to continue moving air from the low pressure side to the high pressure side at a rate now set by the impeller speed. It is desirable to have a valve which can respond quickly when deceleration, load change or load shift point occurs, and recover quickly as when acceleration or higher load is suddenly required. When not energized, it is desirable to minimize bypass leak and corresponding decrease in pump efficiency when full throughput is required from pump. This must be satisfied with robustness as well as cost efficiency, while at the same time not introducing undesirable noise, vibration and harshness, or noise, vibration, harshness (NVH). Historically, bypass valves are comparatively large, heavy electromagnets with machined parts and multiple elastomeric diaphragms, bumpers and seals.

Thus, there is a need to provide an improved air bypass valve that reduces noise and reduces the force to open and close the valve.

SUMMARY

An object of the present invention is to fulfill the need referred to above. In accordance with the principles of an embodiment, this objective is obtained by providing an air bypass valve for a vehicle. The valve includes a solenoid assembly including a magnetic housing, a coil bobbin in the magnetic housing, the coil bobbin having a bore therethrough, a coil disposed about the coil bobbin, the coil being constructed and arranged to be energized to provide a magnetic field, and a magnetic flux ring coupled with the magnetic housing and securing the coil bobbin in the magnetic housing. An armature and seal assembly includes an armature structure having a portion received in the bore of the coil bobbin, the armature structure being constructed and arranged to move with respect to the solenoid assembly from a closed position to an open position in response to the magnetic field generated by the coil, and a seal structure coupled with armature structure so that the seal structure can pivot with respect to the armature structure. The seal structure has a sealing edge constructed and arranged to seal with a manifold component when the armature structure is in the closed position thereof. A spring biases the armature structure to the closed position and a main housing covers the magnetic housing.

In accordance with another aspect of the embodiment, an air bypass valve for a vehicle includes a fixed solenoid assembly including means for generating a magnetic field. An armature and seal assembly includes an armature structure constructed and arranged to move with respect to the solenoid assembly from a closed position to an open position in response to the generated magnetic field, and a seal structure coupled with armature structure. The seal structure has a sealing edge constructed and arranged to seal with a manifold component when the armature structure is in the closed position thereof. Means are provided for coupling the seal structure to the armature structure so that the seal structure can pivot with respect to the armature structure. Means are provided for biasing the armature structure to the closed position.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXAMPLE EMBODIMENT

Figure 1:
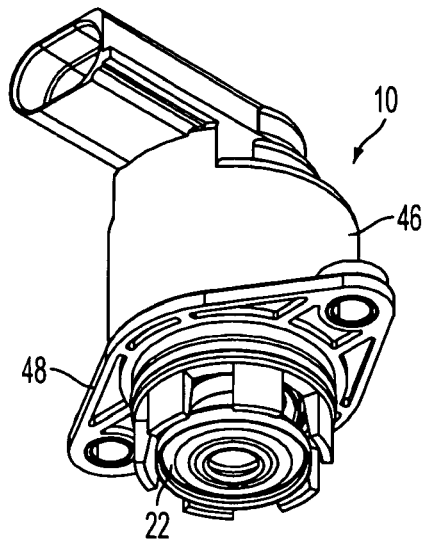
FIG. 1 is a view of a solenoid device in the form of an automotive air bypass valve in accordance with an embodiment of the present invention.

Referring to FIG. 1, an air bypass valve for a vehicle is shown, generally indicated at 10, in accordance with an embodiment of the invention. The air bypass valve detailed herein comprises about fourteen basic parts, potentially none of which are machined, but all of which are preferably injection molded, stamped, or drawn from sheet stock. Such a configuration provides a realized savings in used material volume and type, along with the corresponding environmental and economic benefits.

Figure 2:
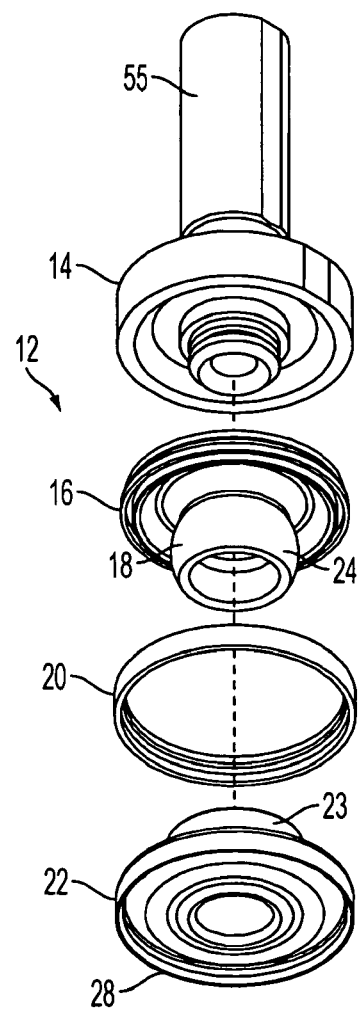
FIG. 2 is an exploded view of an armature and seal assembly of the air bypass valve of FIG. 1.
Figure 3:
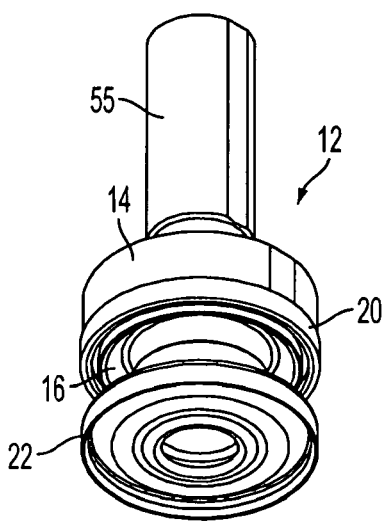
FIG. 3 is an assembled view of the armature and seal assembly of FIG. 2.
Figure 7:
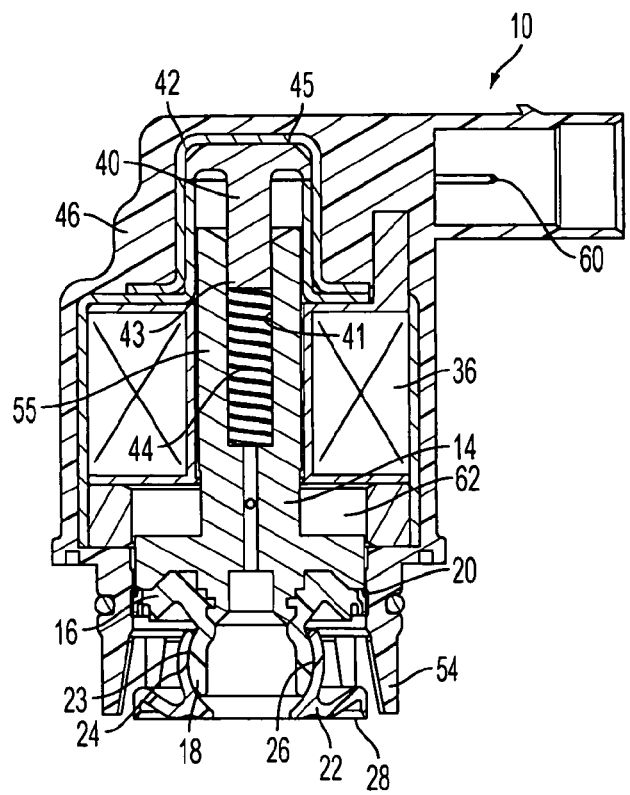
FIG. 7 is a sectional view of a solenoid device of FIG. 1, shown with an armature in a closed position.

With reference to FIGS. 2, 3 and 7, an armature and seal assembly is shown, generally indicated at 12. The armature and seal assembly 12 is the moving component of the valve 10 and includes an armature structure having an armature 14 and a composite, resin or polymer molded pivot gland structure 16 either molded onto the armature 14 or assembled thereto with a mechanical retainer (not shown). The gland structure 16 includes a gland member 18, the function of which will be explained below. A dynamic seal 20 of an appropriate material is either incorporated as part of the gland structure 16, co-injection molded therewith, or coupled thereto as a separate component. The dynamic seal 20 reduces air leakage past the armature 14, reducing both air noise and bypass leakage. Finally, a hard seal structure 22, preferably made of similar materials as the gland structure 16, has a pivot member 23 that is preferably snapped together with the gland member 18. As best shown in FIG. 7, the mating co-centric spherical surfaces (external surface 24 of gland member 18 and internal surface 26 of the pivot member 23) form a pivot function such that the seal structure 22 can rotate with respect to the gland structure 16 and thus the armature 14. The 360° pivot function is necessary to accommodate any dimensional variance from ideal between the axis of the solenoid assembly 30, mounting face of the complete assembly and the sealing surface and mounting surfaces of the respective air manifold component to which the valve assembly 10 is attached. By accommodating these variances, bypass leak is minimized and durable function of the solenoid maximized in allowing the hard sealing edge 28 of the hard seal structure 22 to mate with the opposite mounting sealing surface as parallel as possible. It is noted that the inner spherical surface can be part of the gland member with the outer spherical surface being part of the pivot member 23.

Figure 4:
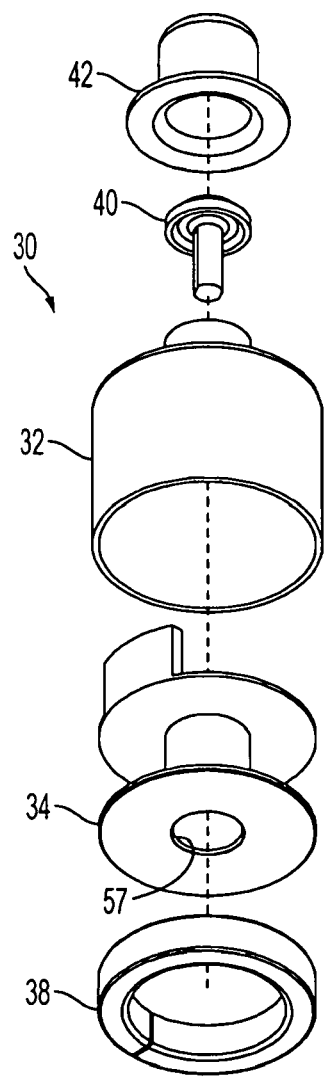
FIG. 4 is an exploded view of a solenoid assembly of the air bypass valve of FIG. 1.
Figure 5:
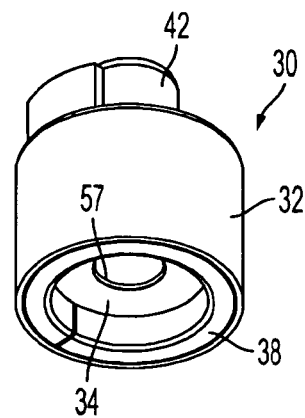
FIG. 5 is an assembled view of the solenoid assembly of FIG. 4.
Figure 8:
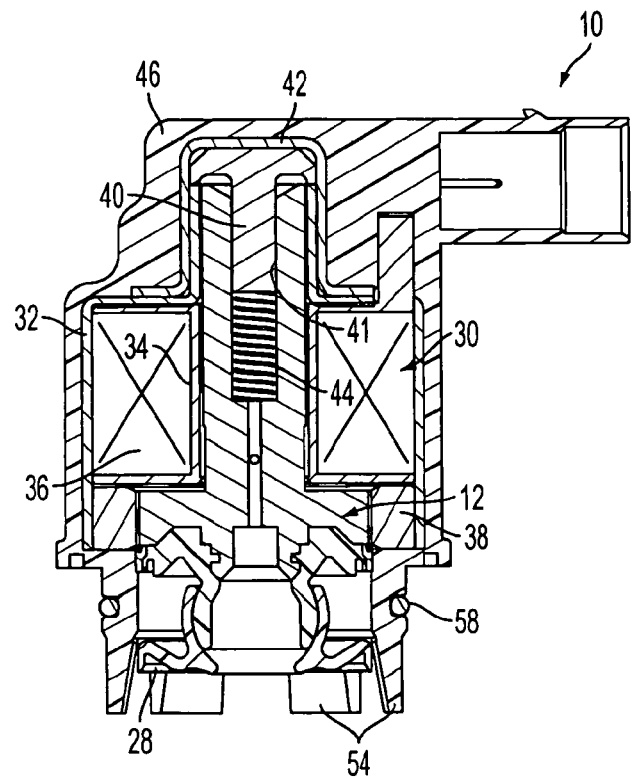
FIG. 8 is a view of the solenoid device of FIG. 7, with the armature shown in an open position.

With reference to FIGS. 4, 5 and 8, solenoid assembly, generally indicated at 30, is shown. The solenoid assembly 30 includes the stationary magnetic components of the valve 10 and comprises a magnetic (e.g., ferrous) housing 32 that provides a flux return path and a datum enclosure for other parts of the valve 10. A coil bobbin 34 is wound with an electromagnet coil 36 of a suitable wire material of an appropriate number of turns to provide the resistance and ampere-turns necessary for proper function with the available control electronics. The coil 36 is not shown in FIG. 4. The coil bobbin 34 with coil 36 is inserted into the housing 32, and a magnetic (e.g., ferrous) flux ring 38 is pressed into the housing 32, retaining the coil bobbin 34 and providing a specific working magnetic pole-type to the armature 14. A spring pin 40 is provided in the housing 32 and a magnetic (e.g., ferrous) end cap 42 is pressed onto the housing 32, thereby retaining the spring pin 40. As shown in FIG. 7, upon assembly, the spring pin 40 is received in a bore 41 in a stem portion 55 of the armature 14 so that a first end 43 of the spring pin 40 engages the spring 44 and a second end 45 of the spring pin 40 is adjacent to the end cap 42. The spring pin 40 provides an axial flux path into the armature 14 as well as guides a closing return spring 44, also in bore 41, in the final assembly. The stator of the solenoid assembly 30 comprises the lump magnetic circuit formed by the magnetic flux ring 38, the magnetic housing 32, the magnetic end cap 42 and, if desired, the spring pin 40.

Figure 6:
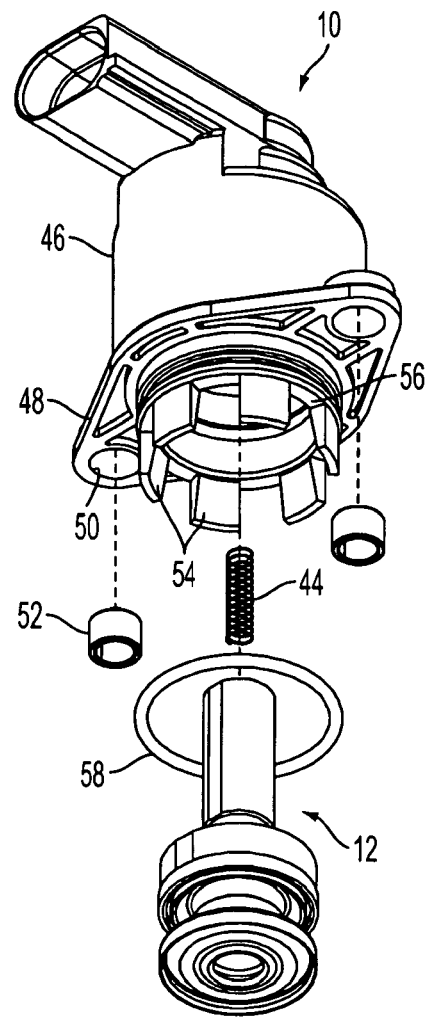
FIG. 6 is an exploded view of the armature assembly being inserted into the overmolded solenoid assembly of the air bypass valve of FIG. 1.

With reference to FIG. 6, the solenoid assembly 30 is over-molded with an appropriate polymer or resin to provide the final encapsulation and retention main housing 46 of all stationary parts for the air bypass valve 10. FIG. 6 shows the final assembly of the valve 10 and also shows how the encapsulation provides a customer specified flange 48 for mounting by the end user. Preferably the flange 48 includes mounting holes 50 that receive, preferably in an encapsulated manner, a support boss 52 therein. In addition, the main housing 46 includes impact protection structure that protect the armature and seal assembly 12 from drops and handling, as well as any manifold sealing O-rings. In the embodiment, the impact protection structure includes a plurality of tabs 54 extending in an annular manner from a bottom surface 56 of the housing 46 so as to generally surround the seal structure 22 of the armature and seal assembly 12.

In the final assembly steps, the closing return spring 44 is inserted into the armature 14, and the armature and seal assembly 12 is the inserted into the solenoid assembly 30. More particularly, a stem portion 55 of the armature 14 is received in a bore 57 in the coil bobbin 34. An O-ring 58 provides a seal with respect to an air manifold (not shown) to which the valve 10 is attached.

Basic operation of the valve 10 will be appreciated with reference to FIGS. 7 and 8. FIG. 7 shows the closed position the valve 10 and armature 14 (biased by spring 44) when the electromagnetic coil 36 is not energized via leads 60. In this position, the magnetic gap working area 62 is clearly shown and the sealing edge 28 is an extended position so as to engage with the manifold surface (not shown). FIG. 8 shows the open position of the valve 10 and armature 14 when voltage is applied to the coil 36 such that a force on the armature 14 overcomes the force of spring 44. In this position, the sealing edge 28 is a retracted position so as to disengage with the manifold surface (not shown).

Thus, the valve 10 is an electronically activated electromagnetic valve whose purpose is to bypass working air from the high pressure side to the low pressure side of a manifold pressure boost pump, turbocharger, supercharger, turbine air pump or similar. The air bypass valve 10 reduces the noise of operation and reducing the force required to both open and close the valve. The air bypass valve provides the functionality for the success, long term operation and efficiency of air boost systems, which depend on responsiveness to dynamic changes and robustness of operation.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An air bypass valve for a vehicle comprising:
   a solenoid assembly comprising:
      a magnetic housing,
      a coil bobbin in the magnetic housing, the coil bobbin having a bore there-through,
      a coil disposed about the coil bobbin, the coil being constructed and arranged to be energized to provide a magnetic field, and
      a magnetic flux ring coupled with the magnetic housing and securing the coil bobbin in the magnetic housing,
   an armature and seal assembly comprising:
      an armature structure having a portion received in the bore of the coil bobbin, the armature structure being constructed and arranged to move with respect to the solenoid assembly from a closed position to an open position in response to the magnetic field generated by the coil, and a seal structure coupled with armature structure so that the seal structure can rotate with respect to the armature structure, the seal structure having a sealing edge constructed and arranged to seal with a manifold component when the armature structure is in the closed position thereof, a spring biasing the armature structure to the closed position, and a main housing covering the magnetic housing.

2. The valve of claim 1, wherein the armature structure includes an armature and a gland structure coupled with the armature, the armature including the portion received in the bore.

3. The valve of claim 2, wherein the gland structure has a gland member defining a generally spherical surface, and the seal structure has a pivot member defining a generally spherical surface that is engaged with the generally spherical surface of the gland member permitting rotation of the seal structure with respect to the armature structure.

4. The valve of claim 2, further comprising a dynamic seal associated with the gland structure, the dynamic seal being constructed and arranged to reduce air leakage past the armature.

5. The valve of claim 1, wherein the main housing defines a plastic overmold covering the magnetic housing.

6. The valve of claim 5, wherein the main housing includes a flange constructed and arranged to mount the housing to the manifold component.

7. The valve of claim 5, wherein the main housing includes impact protection structure constructed and arranged to protect the armature and seal assembly.

8. The valve of claim 7, wherein the impact protection structure includes a plurality of tabs extending in an annular manner from a bottom surface of the housing so as to generally surround the seal structure of the armature and seal assembly.

9. The valve of claim 2, wherein a portion of the armature includes a bore, the spring being disposed in the bore, the valve further comprising spring pin having a first end engaging an end of the spring and magnetic end cap adjacent to a second end of the spring pin such that the spring pin provides a axial flux path into the armature and guides the spring.

10. An air bypass valve for a vehicle comprising:

a fixed solenoid assembly including means for generating a magnetic field, an armature and seal assembly comprising:

an armature structure constructed and arranged to move with respect to the solenoid assembly from a closed position to an open position in response to the generated magnetic field, and a seal structure coupled with armature structure, the seal structure having a sealing edge constructed and arranged to seal with a manifold component when the armature structure is in the closed position thereof, means for coupling the seal structure to the armature structure so that the seal structure can rotate with respect to the armature structure, and means for biasing the armature structure to the closed position.

11. The valve of claim 10, wherein the armature structure includes an armature and a gland structure coupled with the armature.

12. The valve of claim 11, wherein the gland structure has a gland member defining a generally spherical surface, and the seal structure has a pivot member defining a generally spherical surface that is engaged with the generally spherical surface of the gland member permitting rotation of the seal structure with respect to the armature structure, the generally spherical surfaces defining the means for coupling.

13. The valve of claim 11, further comprising a dynamic seal associated with the gland structure, the dynamic seal being constructed and arranged to reduce air leakage past the armature.

14. The valve of claim 10, wherein the solenoid assembly includes a magnetic housing, a coil disposed in the magnetic housing, and a magnetic flux ring coupled with the magnetic housing and securing the coil in the magnetic housing.

15. The valve of claim 14, further comprising a main housing covering the magnetic housing.

16. The valve of claim 15, wherein the main housing defines a plastic overmold covering the magnetic housing.

17. The valve of claim 15, wherein the main housing includes a flange constructed and arranged to mount the housing to the manifold component.

18. The valve of claim 15, wherein the main housing includes impact protection structure constructed and arranged to protect the armature and seal assembly.

19. The valve of claim 18, wherein the impact protection structure includes a plurality of tabs extending in an annular manner from a bottom surface of the housing so as to generally surround the seal structure of the armature and seal assembly.

20. The valve of claim 10, wherein the armature structure includes an armature, a portion of the armature includes a bore, the means for biasing comprising a spring disposed in the bore, the valve further comprising spring pin having a first end engaging an end of the spring, and magnetic end cap adjacent to a second end of the spring pin such that the spring pin provides a axial flux path into the armature and guides the spring.

\* \* \* \* \*